(12) United States Patent
Araki

(10) Patent No.: US 10,320,278 B2
(45) Date of Patent: Jun. 11, 2019

(54) SEMICONDUCTOR DEVICE HAVING A DECREASED SWITCHING LOSS

(71) Applicant: FUJI ELECTRIC CO., LTD., Kawasaki (JP)

(72) Inventor: Ryu Araki, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 15/657,856

(22) Filed: Jul. 24, 2017

(65) Prior Publication Data

US 2017/0324316 A1 Nov. 9, 2017

Related U.S. Application Data

(63) Continuation of application No. PCT/JP2016/068388, filed on Jun. 21, 2016.

(30) Foreign Application Priority Data

Aug. 28, 2015 (JP) ................... 2015-169709

(51) Int. Cl.
*H02M 7/5387* (2007.01)
*H02M 1/08* (2006.01)
(Continued)

(52) U.S. Cl.
CPC ........... *H02M 1/08* (2013.01); *H02M 1/4225* (2013.01); *H02M 3/337* (2013.01); *H02M 5/458* (2013.01); *H02M 5/4585* (2013.01); *H02M 7/5387* (2013.01); *H02M 7/5388* (2013.01); *H02M 2001/007* (2013.01);
(Continued)

(58) Field of Classification Search
CPC ....... H02M 7/5388; H02M 2001/0054; H02M 2001/0051; H02M 2001/0048
See application file for complete search history.

(56) References Cited

U.S. PATENT DOCUMENTS 8,385,092 B1* 2/2013 Shekhawat ............. H02M 1/38
363/132
9,281,776 B2 3/2016 Nojiri et al.
(Continued)

FOREIGN PATENT DOCUMENTS

CN 1033354973 10/2013
JP 7-31182 1/1995
(Continued)

OTHER PUBLICATIONS

English translation of WO 2012/153386, Sep. 26, 2018, 21 pages.*
(Continued)

*Primary Examiner* — Harry R Behm

(57) ABSTRACT

There is provided a semiconductor device capable of decreasing a switching loss. The semiconductor device has first semiconductor elements (Su)-(Sw) and second semiconductor elements (Sx)-(Sz) connected in series, in which the first semiconductor element includes a low switching loss semiconductor element having a switching loss which is smaller than a switching loss of the second semiconductor element and the second semiconductor element includes a low conduction loss semiconductor element having a conduction loss which is smaller than a conduction loss of the first semiconductor element.

19 Claims, 12 Drawing Sheets

(51) Int. Cl.
   *H02M 5/458*   (2006.01)
   *H02M 1/42*   (2007.01)
   *H02M 3/337*   (2006.01)
   *H02M 7/5388*   (2007.01)
   *H02M 1/00*   (2006.01)
   *H02P 27/08*   (2006.01)

(52) U.S. Cl.
   CPC ..... *H02M 2001/0054* (2013.01); *H02P 27/08* (2013.01); *Y02B 70/126* (2013.01); *Y02B 70/1491* (2013.01)

(56) References Cited

U.S. PATENT DOCUMENTS

| | | | | |
|---|---|---|---|---|
| 2010/0079192 | A1* | 4/2010 | Strzalkowski | H02M 7/53803 327/419 |
| 2012/0212170 | A1* | 8/2012 | Matsui | H02M 7/5388 318/503 |
| 2013/0113411 | A1* | 5/2013 | Suzuki | H02P 3/22 318/681 |
| 2013/0307500 | A1* | 11/2013 | Nojiri | H02M 7/53873 323/271 |
| 2014/0009096 | A1* | 1/2014 | Imanaka | H02M 3/155 318/494 |
| 2015/0229205 | A1* | 8/2015 | Buthker | H02M 1/4225 363/126 |

FOREIGN PATENT DOCUMENTS

| | | | |
|---|---|---|---|
| JP | 10-108474 | 4/1998 | |
| JP | 2008-104282 | 5/2008 | |
| JP | 2011-38507 | 2/2011 | |
| JP | 2012-249488 | 12/2012 | |
| JP | 2013-141336 | 7/2013 | |
| WO | WO-2012153368 A1 * | 11/2012 | ........ H02M 7/53871 |

OTHER PUBLICATIONS

International Search Report dated Aug. 9, 2016, in corresponding International Patent Application No. PCT/JP2016/068388.

International Preliminary Report on Patentability dated Mar. 6, 2018 in corresponding International Patent Application No. PCT/JP2016/068388.

Chinese Office Action dated Nov. 30, 2018 from Chinese Patent Application No. 201680008296.9, 16 pages.

\* cited by examiner

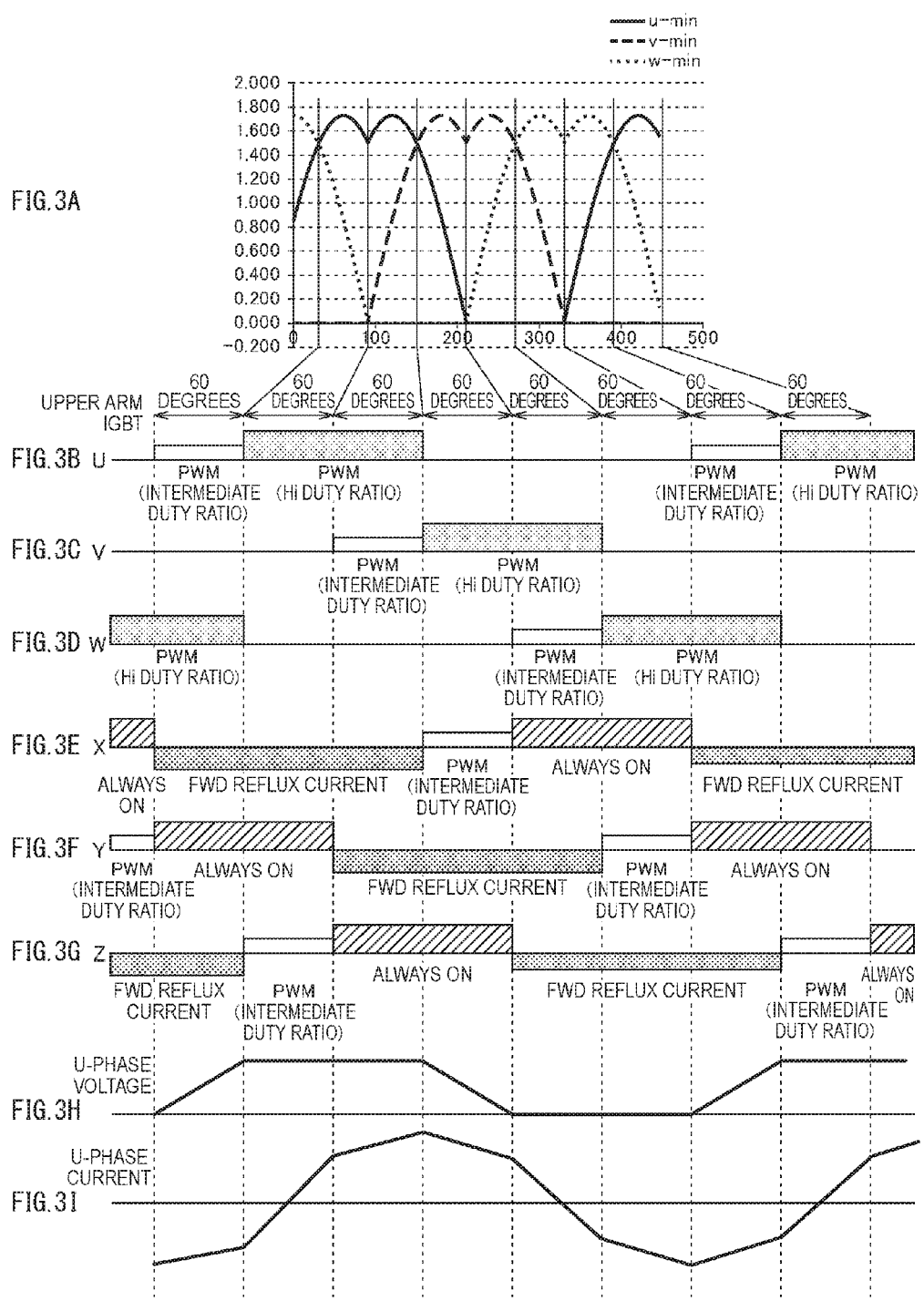

UPPER ARM SWITCHING (TURN-ON)
Eon:0.24mJ

UPPER ARM SWITCHING (TURN-OFF)
Eoff:0.12mJ

LOWER ARM SWITCHING (TURN-ON)
Eon:0.36mJ

LOWER ARM SWITCHING (TURN-OFF)
Eoff:0.14mJ

COMPARATIVE
EXAMPLE

FIRST
EMBODIMENT

Total

☐ FWD_L_trr
☒ FWD_L_vf
☐ IGBT_L_toff
☐ IGBT_L_ton
☐ IGBT_L_Von
☐ FWD_H_trr
☐ FWD_H_vf
☐ IGBT_H_toff
☐ IGBT_H_ton
☐ IGBT_H_Von

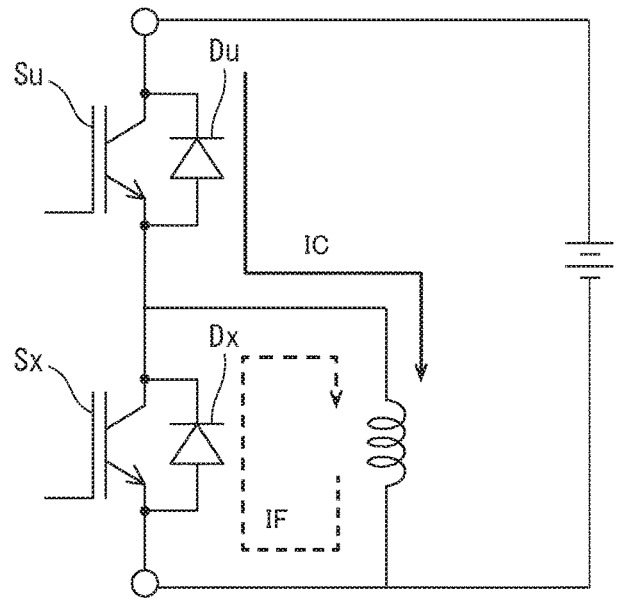
FIG. 9
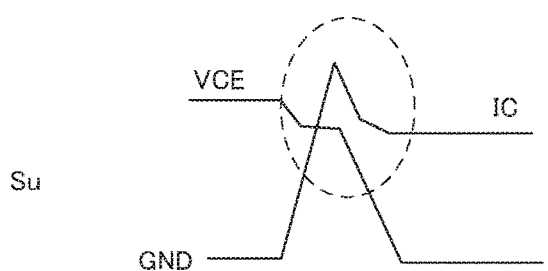
FIG. 10A  Su
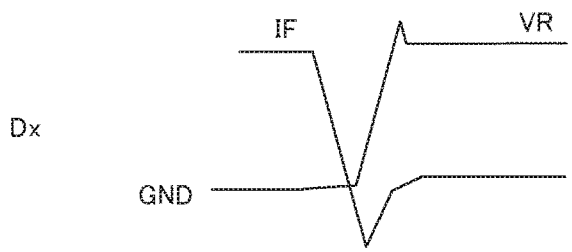
FIG. 10B  Dx

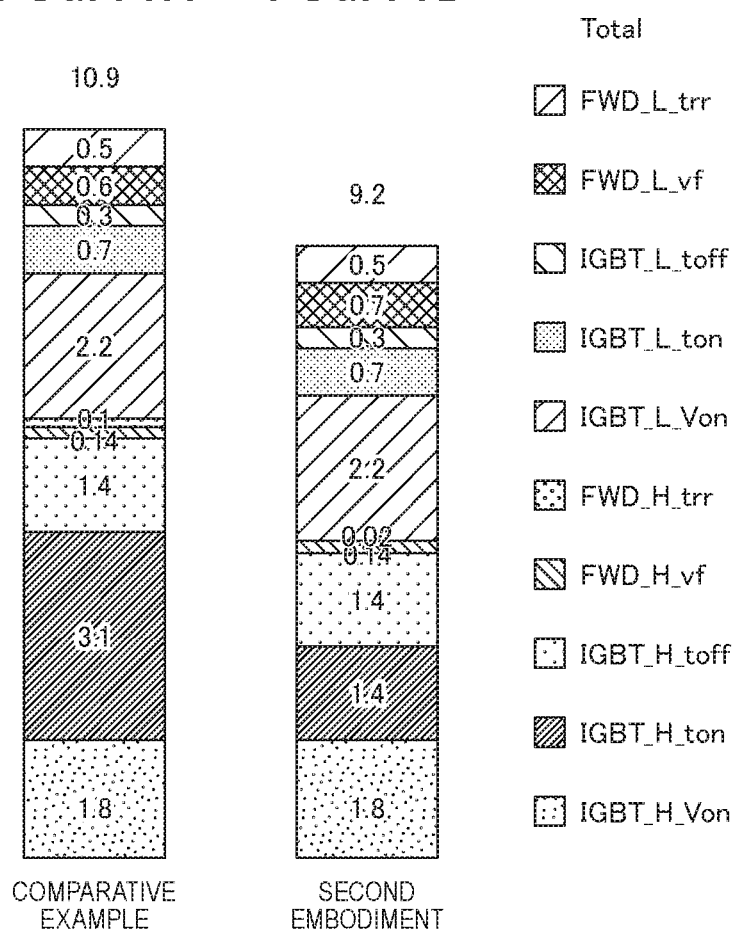

SEMICONDUCTOR DEVICE HAVING A DECREASED SWITCHING LOSS

CROSS-REFERENCE TO RELATED APPLICATIONS

This application is a continuation application, under 35 U.S.C § 111(a), of International Patent Application No. PCT/JP2016/068388, filed Jun. 21, 2016, and based upon the benefit of foreign priority from Japanese Patent Application No. 2015-169709, filed Aug. 28, 2015, the contents of which are incorporated herein by reference.

TECHNICAL FIELD

The present invention relates to a semiconductor device which has a first semiconductor element and a second semiconductor element connected in series and which is applied to a power conversion apparatus and so forth.

BACKGROUND ART

Conventionally, an inverter is applied to an electric motor, a vacuum cleaner, an air-conditioner, a welding machine and so forth as the power conversion apparatus. The semiconductor device in which the first semiconductor element and second semiconductor element are connected in series is used in the inverter and a power factor improvement circuit, a brake circuit and so forth which are peripheral circuits thereof.

In the inverter that a plurality of lines of the series-connected first semiconductor element and second semiconductor elements are connected in parallel, in general, it is intended to use switching semiconductor elements of the same kind such as a MOSFET (Metal-Oxide-Semiconductor Field-Effect Transistor), an IGBT (Insulated Gate Bipolar Transistor) and so forth as the first semiconductor elements which constitute an upper arm and the second semiconductor elements which constitute a lower arm.

Then, for example, in an inverter control circuit used in the vacuum cleaner, as a lower-arm-side switching element which constitutes the inverter control circuit, a switching element (for example, a wide band gap semiconductor element which uses gallium nitride (GaN), silicon carbide (SiC), diamond and so forth) which makes switching of a speed which is higher than that of an upper-arm-side switching element (for example, the IGBT) possible is applied (for example, see Patent Literature 1). In this Patent Literature 1, inverter control of a two-phase modulation system which is so made as to turn the upper-arm switching element on and turn the lower-arm switching element off in turn at intervals of $2\pi/3$ at each phase voltage of three phase voltages to be applied to the motor thereby to periodically fix each phase voltage is performed.

CITATION LIST

Patent Literature

PTL 1: JP 2012-249488 A

SUMMARY OF INVENTION

Technical Problem

Incidentally, in the conventional example described in Patent Literature 1, a switching element which is faster in switching speed than a switching element on the upper arm side is used on the lower arm side and further the inverter control of the two-phase modulation system is performed so as to reduce a variation in switching loss (heat generation) between switching elements of the upper and lower arms.

However, there is such a problem that it is impossible to sufficiently improve the switching loss when turning-on of the lower-arm switching element simply by making the switching speed of the lower-arm switching element faster than the switching speed of the upper-arm switching element as in the above-mentioned conventional example.

Accordingly, the present invention is made focusing on the problem of the above-mentioned conventional example and to provide a semiconductor device which is capable of reducing the total loss of the upper and lower arms by reducing switching losses when turning-on of the switching elements is set as an object thereof.

Solution to Problem

In order to attain the above-mentioned object, one aspect of the semiconductor device according to the present invention has a first semiconductor element and a second semiconductor element connected in series, in which the first semiconductor element includes a low switching loss semiconductor element having a switching loss which is smaller than a switching loss of the second semiconductor element and the second semiconductor element includes a low conduction loss semiconductor element having a conduction loss which is smaller than a conduction loss of the first semiconductor element.

Advantageous Effects of Invention

According to one aspect of the present invention, it is possible to reduce the switching losses when turning-on of the switching elements and thereby to reduce the total loss of the upper and lower arms.

BRIEF DESCRIPTION OF DRAWINGS

FIGS. 3A to 3I are signal waveform diagrams of respective phases of a lower-side-stuck two-phase modulation system in the first embodiment;

FIG. 4A illustrates the power supply path in a conduction section T1 and FIG. 4B illustrates the power supply path in a section T2;

FIG. 9 is a circuit diagram illustrating an arm for one phase of the comparative example corresponding to the second embodiment;

FIGS. 10A and 10B are waveform diagrams of the collector-to-emitter voltage and the collector current when turning-on of the upper arm in FIG. 9 and a waveform diagram of a reflux current and a reverse recovery voltage in reverse recovery of a lower-arm freewheeling diode;

FIGS. 11A and 11B are diagrams expressing simulation results of respective losses of one switching arm section. FIG. 11A is a graph expressing the loss of the comparative example and 11B is a graph of the loss of the second embodiment;

DESCRIPTION OF EMBODIMENTS

Next, one embodiment of the present invention will be described with reference to the drawings. In the following description of the drawings, the same or similar symbols are assigned to the same or similar parts.

In addition, the embodiments which will be indicated below are the ones which exemplify a device and a method for embodying the technical idea of the present invention and the technical idea of the present invention does not specify materials, shapes, structures, arrangements and so forth of constitutional components to the ones mentioned below. It is possible for the technical idea of the present invention to add various alterations within a technical range that the claims described in the scope of patent claims define.

In the following, a driving device of a semiconductor element according to one embodiment of the present invention will be described with reference to the drawings. In the present embodiment, description will be made by taking a voltage drive type semiconductor element as an example of the semiconductor element and taking a gate driving device of the semiconductor element as an example of the driving device of the semiconductor element.

First, a power conversion apparatus 10 which is equipped with a semiconductor device according to the present embodiment will be described by using FIG. 1.

Figure 1:
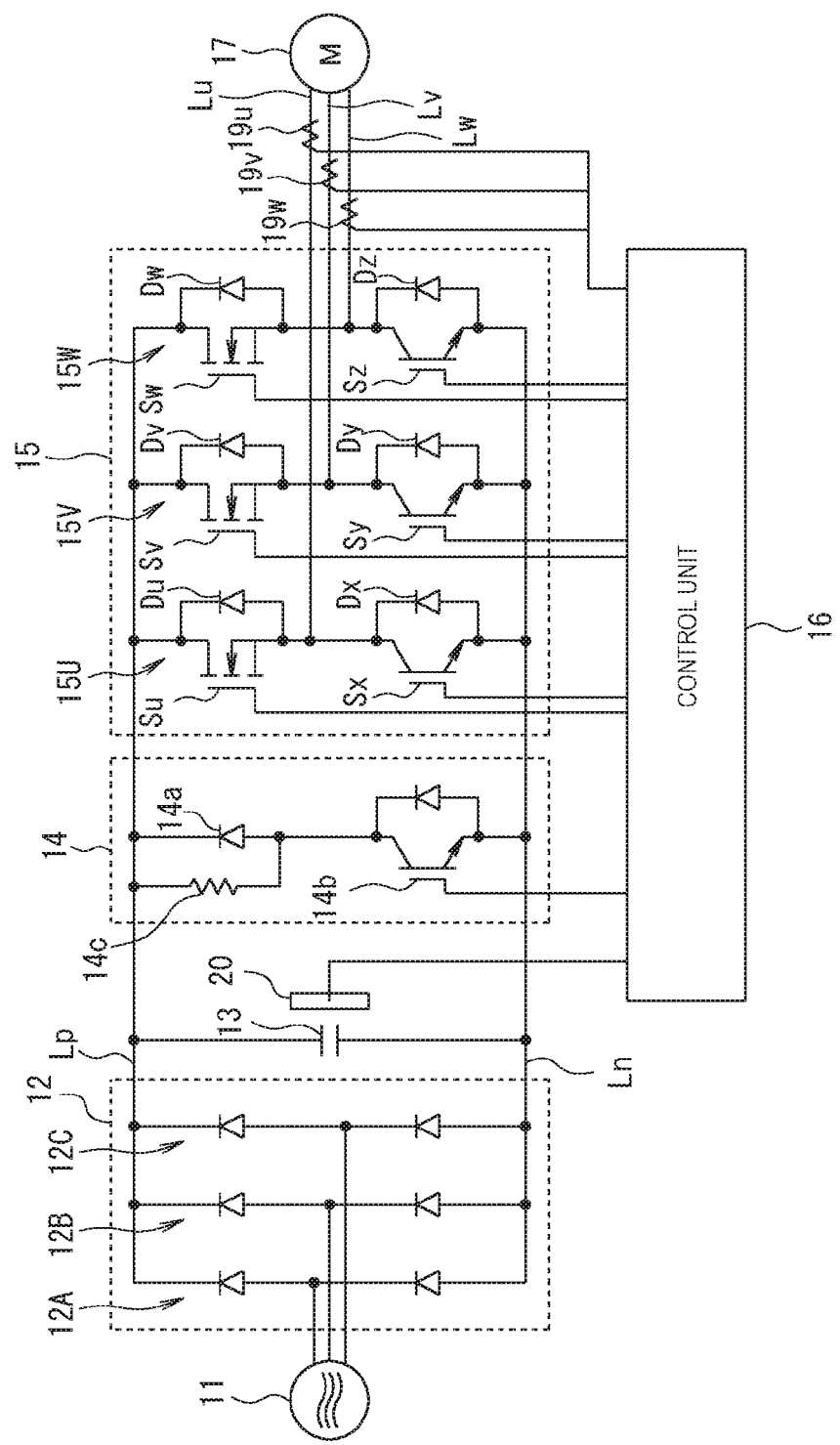
FIG. 1 is a circuit diagram illustrating a first embodiment of a semiconductor device according to the present invention.

As illustrated in FIG. 1, the power conversion apparatus 10 is equipped with a full-wave rectification circuit 12 which converts three-phase AC power which is input from a three-phase AC power source 11 into DC power, a smoothing capacitor 13 which smooths out the DC power which is output through a positive electrode line Lp and a negative electrode line Ln of the full-wave rectification circuit 12, a brake circuit 14 which is connected in parallel with the smoothing capacitor 13, an inverter unit 15 which is connected in parallel with the brake circuit 14 and which drives a three-phase motor 17 as a load, and a control unit 16 which controls the brake circuit 14 and the inverter unit 15.

The full-wave rectification circuit 12 includes a full-bridge circuit in which series circuits 12A, 12B and 12C in which two diodes are connected in series are connected in parallel between the positive electrode line Lp and the negative electrode line Ln. Each phase power of the three-phase AC power source 11 is supplied to a connection point between the diodes of each of the series circuits 12A, 12b and 12C and each phase power is subjected to full-wave rectification by each diode and the DC power is output from between the positive electrode line Lp and the negative electrode line Ln.

The brake circuit 14 is made so as to consume a regenerative current through a resistor for protection from an overvoltage which is applied to the inverter unit 15 when subjecting the three-phase motor 17 to regenerative braking. The brake circuit 14 includes a surge absorbing diode 14a, a switching semiconductor element 14b, and an externally attached resistor 14c connected in parallel with the diode 14a.

Then, a cathode of the diode 14a and one end of the resistor 14c are connected to the positive electrode line Lp and a connection point of an anode of the diode 14a with the other end of the resistor 14c is connected to a collector of an insulated gate bipolar transistor (in the following, referred to as an IGBT) which works as the switching semiconductor element 14b. An emitter of the IGBT is connected to the negative electrode line Ln and a gate thereof is connected to the control unit 16.

The inverter unit 15 is equipped with a U-phase switching arm section 15U, a V-phase switching arm section 15V and a W-phase switching arm section 15W which are connected in parallel between the positive electrode line Lp and the negative electrode line Ln.

The U-phase switching arm section 15U is, an upper arm part which is connected to the positive electrode line Lp is constituted a first semiconductor element Su which includes an N-channel type MOSFET (Metal-Oxide-Semiconductor Field-Effect transistor) which is smaller in switching loss than the IGBT and a freewheeling diode Du connected in anti-parallel with this first semiconductor element Su.

The U-phase switching arm section 15U is, a lower arm part connected to the negative electrode line Ln is constituted by a second semiconductor element Sx which includes the IGBT which is smaller in conduction loss than the MOSFET and a freewheeling diode Dx connected in anti-parallel with this second semiconductor element Sx.

Then, a drain of the MOSFET which includes the first semiconductor element Su is connected to the positive electrode line Lp, a source thereof is connected to a collector of the IGBT which includes the second semiconductor element Sx, and an emitter of the IGBT which includes the second semiconductor element Sx is connected to the negative electrode line Ln.

The V-phase switching arm section 15V is, an upper arm part which is connected to the positive electrode line Lp is constituted by a first semiconductor element Sv which includes the MOSFET and a freewheeling diode Dv which is connected in anti-parallel with this first semiconductor element Sv, and a lower arm part which is connected to the negative electrode line Ln is constituted by a second semiconductor element Sy which includes the IGBT and a freewheeling diode Dy connected in anti-parallel with this second semiconductor element Sy.

The W-phase switching arm section 15W is, an upper arm part which is connected to the positive electrode line Lp is constituted by a first semiconductor element Sw which includes the MOSFET and a freewheeling diode Dw which is connected in anti-parallel with this first semiconductor element Sw, and a lower arm part which is connected to the negative electrode line Ln is constituted by a second semiconductor element Sz which includes the IGBT and a freewheeling diode Dz which is connected in anti-parallel with this second semiconductor element Sz.

Relations of connection between the first semiconductor elements Sv, Sw and the second semiconductor elements Sy, Sz of these V-phase switching arm section 15V and W-phase switching arm section 15W are made the same as the aforementioned relation of connection between them of the U-phase switching arm section 15U.

Then, gates of the first semiconductor elements Su-Sw and the second semiconductor elements Sx-Sz of the switching arm sections 15U-15W of respective phases are connected to the control unit 16.

A U-phase output, a V-phase output and a W-phase output which are output from connection points between the first semiconductor elements Su, Sv, Sw and the second semiconductor elements Sx, Sy, Sz of the switching arm sections 15U, 15V and 15W of the respective phases are respectively output to a U-phase winding wire, a V-phase winding wire and a W-phase winding wire of the three-phase motor 17 as the load.

A U-phase current detection value, a V-phase current detection value and a W-phase current detection value are input into the control unit 16 from current detectors 19$u$, 19$v$ and 19$w$ which detect output currents of output lines Lu, Lv and Lw of the inverter unit 15. In addition, a voltage detection value is input into the control unit 16 from a voltage detector 20 which detects a terminal voltage between both ends of the smoothing capacitor 13.

The control unit 16 controls a gate of the IGBT which serves as the fourth semiconductor element of the brake circuit 14 such that the terminal voltage does not become an overvoltage due to regenerative power which is input from the three-phase motor 17 when subjected to regenerative braking on the basis of the terminal voltage which is input from the voltage detector 20.

In addition, the control unit 16 controls a first semiconductor element 15$a$ and a second semiconductor element 15$b$ of the U-phase switching arm section 15U with lower-side-stuck two-phase modulation on the basis of the current detection values which are input from the current detectors 19$u$-19$w$ and a not illustrated current command value.

Figure 2A:
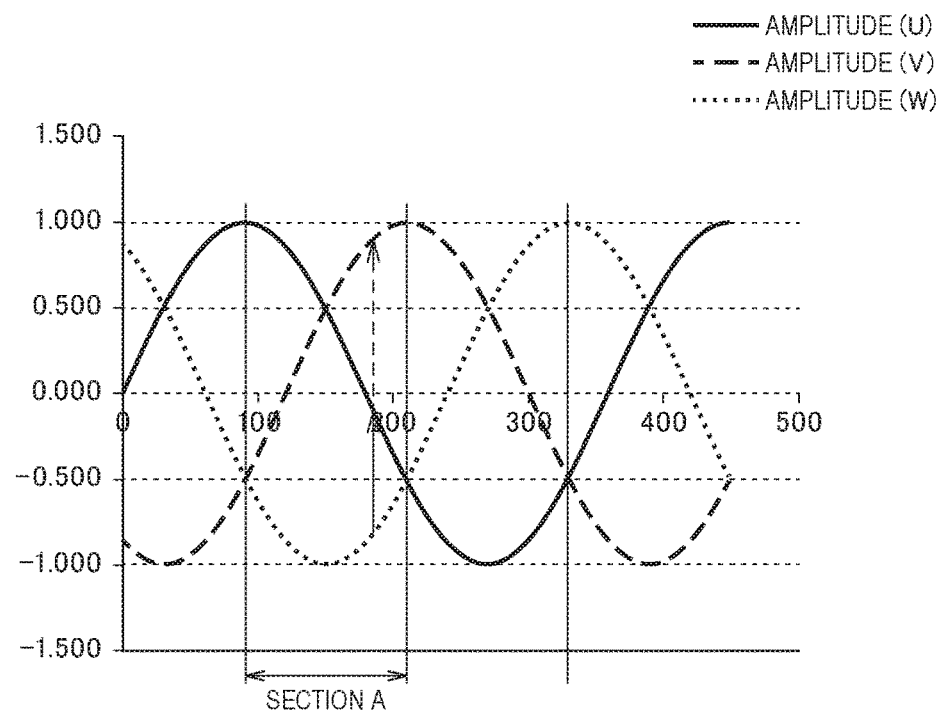
FIGS. 2A and 2B are waveform diagrams illustrating a three-phase sine-wave control waveform and a lower-side-stuck two-phase modulation control waveform.

Here, the lower-side-stuck two-phase modulation control is a method of expressing a three-phase alternating current by seeing other two phases always from a phase of a minimum voltage by a three-phase AC voltage. Consequently, it results in expression of the three-phase alternating current by two-phase alternating current. That is, it means that in a section A of the three-phase alternating current illustrated in FIG. 2A, the W phase is at the lowest voltage and the three-phase alternating current is expressed by the voltages of the U phase and V phase viewed from the W phase. Although in a balanced three-phase current, it is defined by a three-phase AC waveform which is different only in phase, it indicates that, in reality, the balanced three-phase alternating current can be expressed by two AC waveforms.

Figure 2B:
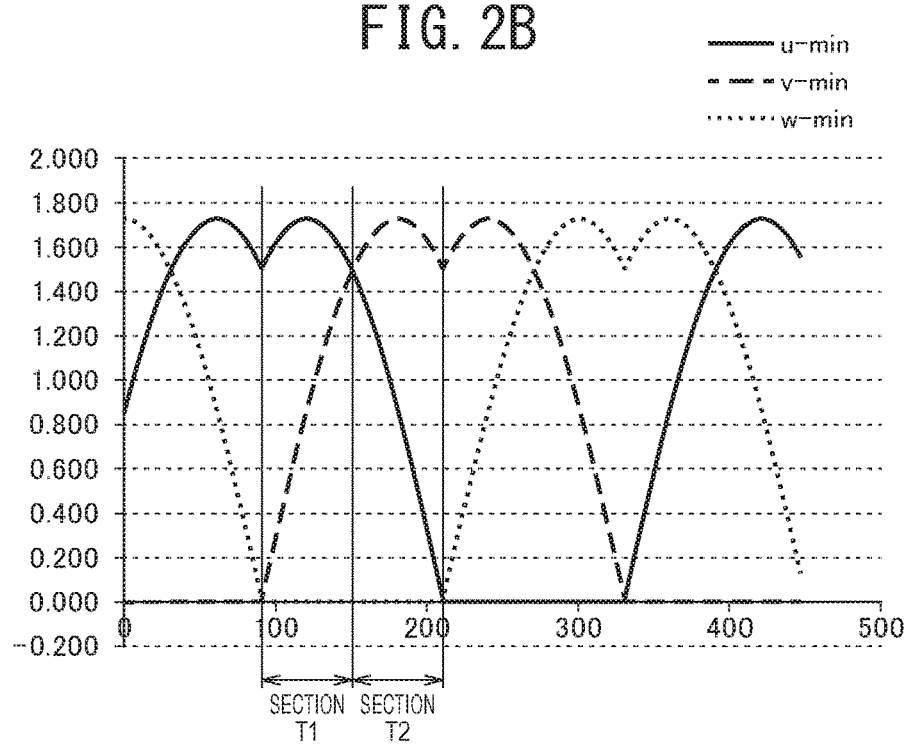

When this two-phase modulation system is adopted, the AC waveform becomes a bottom-shaped waveform that any one of phases has stuck to the zero potential at intervals of 120 degrees as illustrated in FIG. 2B. Drive waveforms of the first semiconductor elements Su-Sw and the second semiconductor elements Sx-Sz of the switching arm sections 15U-15W of the respective phases by the control unit 16 in order to obtain this bottom-shaped waveform are illustrated in FIGS. 3A to 3I.

The operation of this control unit 16 will be described in regard to sections T1 and T2 that the W-phase sticks to the zero potential in FIG. 2B.

In the section T1, as illustrated in FIG. 3B, the first semiconductor element Su of the U-phase switching arm section 15U which serves as an upper arm is driven with pulse width modulation (PWM) in a Hi duty ratio which is large in duty ratio (a pulse width for instructing ON of the semiconductor element is wide). In addition, as illustrated in FIG. 3C, the first semiconductor element Sv of the V-phase switching arm section 15V is driven with pulse width modulation (PWM) in an intermediate duty ratio. Further, as illustrated in FIG. 3D, the first semiconductor element Sw of the W-phase switching arm section 15W is controlled to an OFF state.

On the other hand, as illustrated in FIG. 3E, the second semiconductor element Sx of the U-phase switching arm section 15U which serves as a lower arm enters the OFF state and a reflux current flows to the freewheeling diode Dx. In addition, as illustrated in FIG. 3F, the second semiconductor element Sy of the V-phase switching arm section 15V is in the OFF state and the reflux current flows to the freewheeling diode Dy. Further, as illustrated in FIG. 3G, the second semiconductor element Sz of the W-phase switching arm section 15W is controlled to an always-ON state.

Figure 4A:
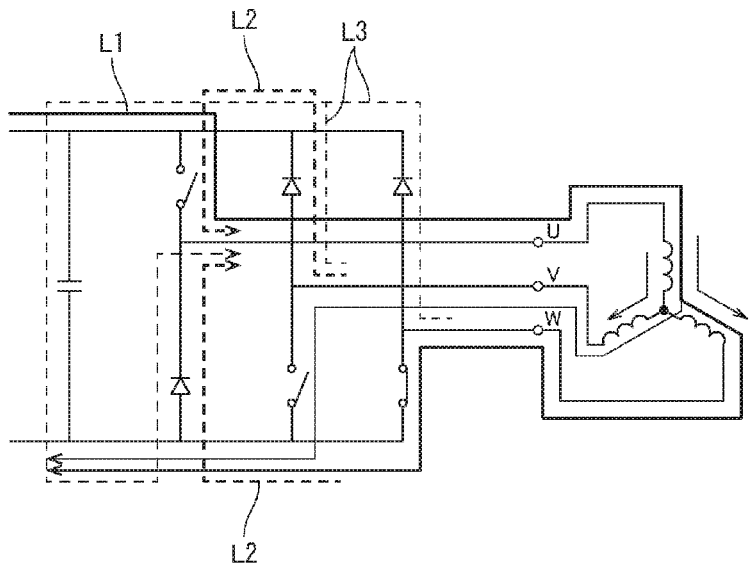
FIGS. 4A and 4B are explanatory diagrams illustrating a W-phase powder supply path in FIG. 2B.

Therefore, a current path of the inverter unit 15 and the three-phase motor 17 in the section T1 flows as indicated by a bold solid line L1 in FIG. 4A. That is, a motor current flows from the positive electrode line Lp through the first semiconductor element Su of the U-phase switching arm section 15U, through a U-phase winding wire of the three-phase motor 17 and respectively through a V-phase winding wire and a W-phase winding wire from a neutral point and through the second semiconductor element Sy or the freewheeling diode Dy of the V-phase switching arm section 15V (the current flows to the second semiconductor element Sy as it is or flows in a form that the reflux current of the freewheeling diode Dy is reduced depending on the orientation of the current which actually flows to the V-phase. The same shall apply hereinafter) and the second semiconductor element Sz of the W-phase switching arm section 15W to the negative electrode line Ln.

On the other hand, the reflux current from the three-phase motor 17 flows as indicated by a bold solid line L2. That is, the reflux current from the V-phase winding wire of the three-phase motor 17 flows through the freewheeling diode Dv of the upper arm part of the V-phase switching arm section 15V—the positive electrode line Lp—the first semiconductor element Su of the U-phase switching arm section 15U toward the U-phase winding wire of the three-phase motor 17. In addition, the reflux current from the W-phase winding wire of the three-phase motor 17 flows through the second semiconductor element Sz of the W-phase switching arm section 15W—the negative electrode line Ln—the freewheeling diode Dx of the lower arm part of the U-phase switching arm section 15U toward the U-phase winding wire of the three-phase motor 17.

Further, when all the semiconductor elements are in the OFF states, the reflux current from the three-phase motor 17 flows as indicated by a fine broken line L3 in FIG. 4A. That is, the reflux current from the V-phase winding wire of the three-phase motor 17 flows through the freewheeling diode Dv of the upper arm part of the V-phase switching arm section 15V—the positive electrode line Lp—the smoothing capacitor 13—the negative electrode line—the freewheeling diode Dx of the lower arm part of the U-phase switching arm section 15U to the U-phase winding wire of the three-phase motor 17. In addition, the reflux current from the W-phase winding wire of the three-phase motor 17 flows through the freewheeling diode Dw of the upper arm part of the W-phase switching arm section 15W—the positive electrode line Lp—the smoothing capacitor 13—the negative electrode line—the freewheeling diode Dx of the lower arm part of the U-phase switching arm section 15U to the U-phase winding wire of the three-phase motor 17.

On the other hand, in the section T2, the inverter unit 15 is controlled by the control unit 16 as illustrated in FIGS. 3A to 3C. That is, as illustrated in FIG. 3B, the first semiconductor element Su of the U-phase switching arm section 15U is controlled to the OFF state. In addition, as illustrated in FIG. 3C, the first semiconductor element Sv of the V-phase switching arm section 15V is controlled with pulse width modulation in the Hi duty ratio of a comparatively wide pulse width. Further, as illustrated in FIG. 3D, the first semiconductor element Sw of the W-phase switching arm section 15W is controlled to the OFF state.

Simultaneously therewith, as illustrated in FIG. 3E, the second semiconductor element Sx of the U-phase switching arm section 15U is controlled with pulse width modulation (PWM) in the intermediate duty ratio. In addition, as illustrated in FIG. 3F, the second semiconductor element Sy of the V-phase switching arm section 15V is controlled to the OFF state and the reflux current flows to the freewheeling diode Dy. Further, as illustrated in FIG. 3G, the second semiconductor element Sz of the W-phase switching arm section 15W is controlled to the always-ON state.

Figure 4B:
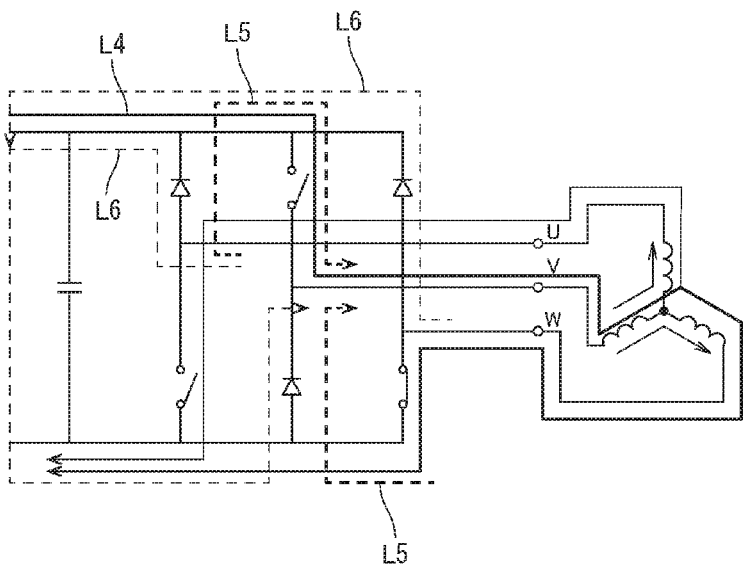

Therefore, the current path of the inverter unit 15 and the three-phase motor 17 in the section T2 flows as indicated by a bold solid line L4 in FIG. 4B. That is, the motor current flows from the positive electrode line Lp through the first semiconductor element Sv of the V-phase switching arm section 15V, through the V-phase winding wire of the three-phase motor 17 and respectively through the U-phase winding wire/the freewheeling diode Dx and the W-phase winding wire from the neutral point, and through the second semiconductor element Sx of the U-phase switching arm section 15U and the second semiconductor element Sz of the W-phase switching arm section 15W to the negative electrode line Ln.

On the other hand, the reflux current from the three-phase motor 17 flows as indicated by a solid solid line L5. That is, the reflux current from the U-phase winding wire of the three-phase motor 17 flows through the freewheeling diode Du of the upper arm part of the U-phase switching arm section 15U—the positive electrode line Lp—the first semiconductor element Sv of the V-phase switching arm section 15V toward the V-phase winding wire of the three-phase motor 17. In addition, the reflux current from the W-phase winding wire of the three-phase motor 17 flows through the second semiconductor element Sz of the W-phase switching arm section 15W—the negative electrode line Ln—the freewheeling diode Dx of the lower arm part of the U-phase switching arm section 15U toward the V-phase winding wire of the three-phase motor 17.

Further, when all the semiconductor elements are in the OFF states, the reflux current from the three-phase motor 17 flows as indicated by the fine broken line L6 in FIG. 4B. That is, the reflux current from the U-phase winding wire of the three-phase motor 17 flows through the freewheeling diode Du of the upper arm part of the U-phase switching arm section 15U—the positive electrode line Lp—the smoothing capacitor 13—the negative electrode line—the freewheeling diode Dy of the lower arm part of the V-phase switching arm section 15V to the V-phase winding wire of the three-phase motor 17. In addition, the reflux current from the W-phase winding wire of the three-phase motor 17 flows through the freewheeling diode Dw of the upper arm part of the W-phase switching arm section 15W—the positive electrode line Lp—the smoothing capacitor 13—the negative electrode line—the freewheeling diode Dx of the lower arm part of the U-phase switching arm section 15U to the V-phase winding wire of the three-phase motor 17.

Accordingly, as illustrated in FIG. 2B, a U-phase two-phase modulated waveform increases from the start of the section T1, takes a peak value and thereafter decreases, keeps decreasing in the section T2 and lowers down to the lowest potential (a potential which is noted as −0.200 in the drawing. In the following, it is also referred to as the zero potential). On the contrary, as illustrated in FIG. 2B, a V-phase two-phase modulated waveform begins increasing from the zero potential at the start of the section T1, keeps increasing also in the section T2, takes the peak value and thereafter decreases. Further, as illustrated in FIG. 2B, a W-phase two-phase modulated waveform maintains the zero potential between the section T1 and the section T2.

Eventually, as illustrated in FIG. 2B, the U-phase two-phase modulated waveform, the V-phase two-phase modulated waveform and the W-phase two-phase modulated waveform respectively become the same waveform which has the bottom-shaped waveform on the upper side and maintains the zero potential through 120 degrees at intervals of 240 degrees ($2\pi/3$) in electrical angle and have a phase difference of 120 degrees among the respective phases.

For example, a U-phase voltage has a trapezoidal waveform as illustrated in FIG. 3H and a U-phase current becomes a state which is approximate to a sine wave as illustrated in FIG. 3I by controlling the first semiconductor elements Su-Sw and the second semiconductor element Sx-Sz which configure the inverter unit 15 with two-phase modulation in this way. Incidentally, FIGS. 3H, 3I correspond to cases where the above-mentioned Hi duty ratio and intermediate ratio are fixed.

Since, in this two-phase modulation control, any one of the second semiconductor elements Sx-Sz of any one of the switching arm sections 15U-15W is always maintained in the always-ON state with no switching, it is possible to reduce a switching loss in comparison with the case of performing three-phase sine-wave driving by that amount. In addition, the power source utilization factor is high and a maximum value of an inter-line voltage of the three-phase motor 17 which works as the load becomes a DC voltage Vdc which is output from the full-wave rectification circuit 12.

In contrast to this, in the case of conventional three-phase sine-wave driving, the first semiconductor elements and the second semiconductor elements which constitute switching arm sections of three phases are always controlled with pulse width modulation (PWM). Therefore, in the three-phase sine-wave driving, the switching loss is much, the power source utilization factor is low and the maximum value of the inter-line voltage of the three-phase motor 17 which works as the load amounts to $\sqrt{3}$ Vdc/2=0.86 Vdc of the DC voltage Vdc which is output from the full-wave rectification circuit 12.

It becomes possible to reduce the switching loss for the three-phase sine-wave control by controlling the inverter unit 15 with two-phase modulation in this way.

Incidentally, in a case of controlling the inverter unit 15 with two-phase modulation, as described above, there are lower-side-stuck two-phase modulation control that the second semiconductor elements Sx-Sz of the lower arm part are set to the always-ON states without making them perform the switching operations and the bottom-shaped waveform is formed on the upper side as described above and upper-side-stuck two-phase modulation control which is described in Patent Literature 1 and that the first semiconductor elements Su-Sw of the upper arm part are set to the always- ON states without making them perform the switching operations and the bottom-shaped waveform is formed on the lower side.

However, the lower-side-stuck two-phase modulation control which has been described in the above-mentioned embodiment is capable of more reducing the switching loss than the upper-side-stuck two-phase modulation control.

The reason therefor is as follows. In general, the inverter unit 15 is constituted as an intelligent power module (IPM) that three arms of the U-phase switching arm section 15U, the V-phase switching arm section 15V and the W-phase switching arm section 15W are made as one module.

Figure 5:
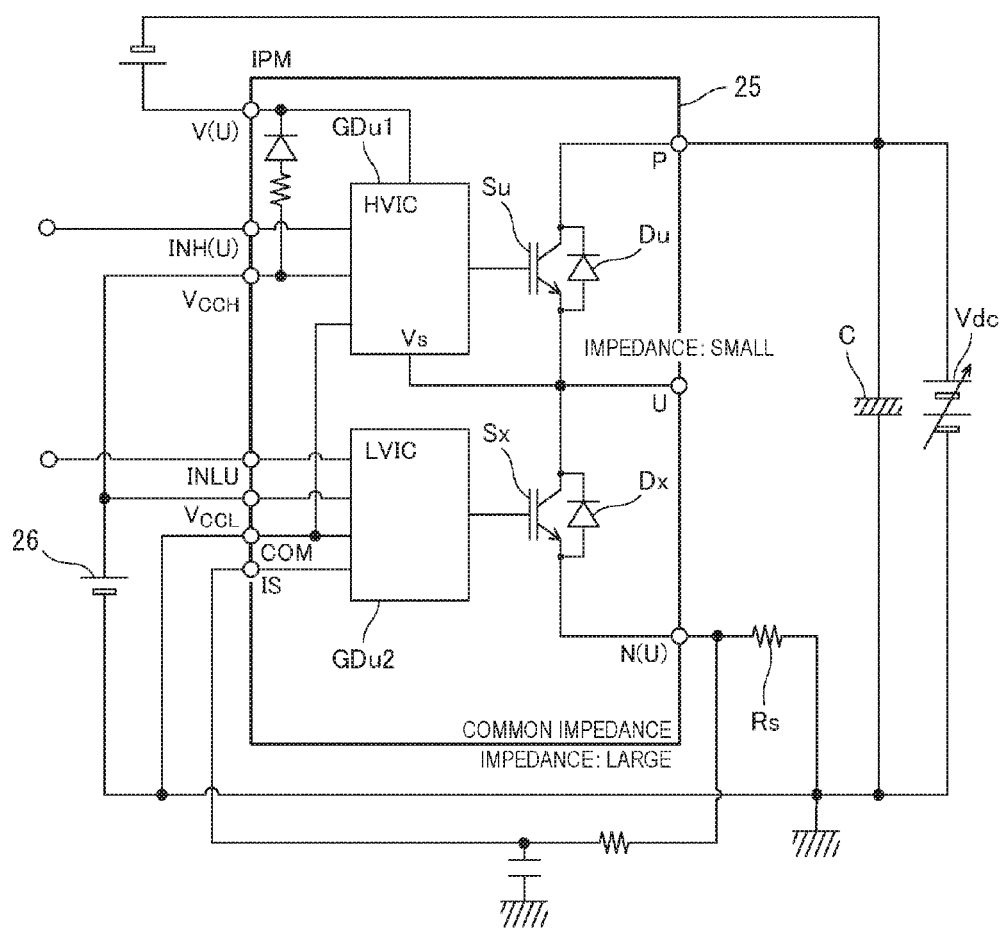
FIG. 5 is a circuit diagram of an intelligent power module which configures a U-phase arm in the first embodiment.

This intelligent power module is, a circuit configuration in a case where, for example, the U-phase switching arm section 15U is extracted is as illustrated in FIG. 5.

That is, an intelligent power module 25 is equipped with the first semiconductor element Su and the freewheeling diode Du which constitute the upper arm part of the U-phase switching arm section 15U which is connected in series between a positive electrode terminal P and a negative electrode terminal N and the second semiconductor element Sx and the freewheeling diode Dx which constitute the lower arm part thereof. A first gate drive circuit GDu1 is connected to a gate of the first semiconductor element Su and a second gate drive circuit GDu2 is connected to a gate of the second semiconductor element Sx. The first gate drive circuit GDu1 and the second gate drive circuit GDu2 are respectively connected to power source terminals $Vcc_H$ and $Vcc_L$ to which the positive electrode side of a DC control power source 26 is connected and are connected to a common ground terminal COM to which a connection point of the negative electrode side of the DC control power source 26 with the ground is connected and a controlled power source is applied thereto.

The first gate drive circuit GDu1 is provided with a reference voltage terminal Vs to which an emitter of the first semiconductor element Su is connected and a reference voltage at this reference voltage terminal Vs becomes the reference of a gate drive signal of the first semiconductor element Su.

In addition, a parallel circuit of the DC power source Vdc with the smoothing capacitor C is connected between the positive electrode terminal P of the intelligent power module 25 and the ground and a shunt resistor Rs which detects the U-phase current is connected between the negative electrode terminal N and the ground.

The first gate drive circuit GDu1 and the first semiconductor element Su are, the reference voltage terminal Vs is connected to the emitter of the first semiconductor element Su by internal wiring in this way. Therefore, an impedance between the emitter of the first semiconductor element Su and the reference voltage terminal Vs is limited only to an internal wiring impedance and therefore has a small value.

On the other hand, the second gate drive circuit GDu2 and the second semiconductor element Sx are, an emitter of the second semiconductor element Sx is connected to the common ground terminal COM via the shunt resistor Rs. Therefore, they are influenced by a common impedance in a large impedance including those of the shunt resistor Rs and external wiring.

Figure 6A:
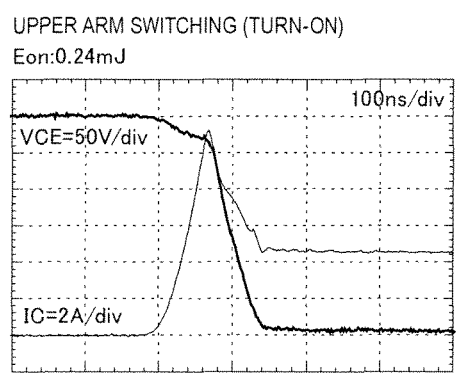
FIGS. 6A to 6D are signal waveform diagrams illustrating a collector-to-emitter voltage and a collector current when turning-on and turning-off of the upper arm and the lower arm in FIG. 5.

Accordingly, as illustrated in FIG. 6A, a switching characteristic when turning-on of the first semiconductor element Su is, a collector current Ic becomes a sharp waveform which is steep in ±di/dt and a switching loss Eon when turning-on becomes as relatively little as 0.24 mJ as indicated by a characteristic line L21.

Figure 6B:
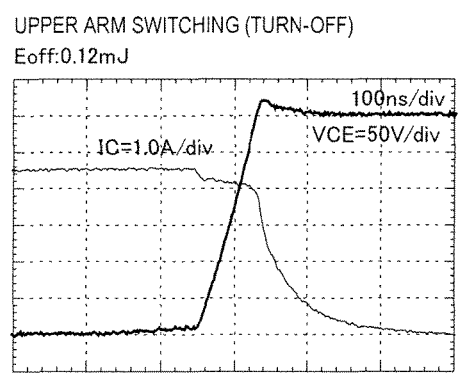

In contrast, as illustrated in FIG. 6B, the switching characteristic when turning-on of the second semiconductor element Sx is, ±di/dt becomes duller than that of the first semiconductor element Su by being influenced by the wiring impedance of the shunt resistor Rs for current detection and thereby the switching loss Eon when turning-on becomes 0.38 mJ and becomes more worse than that of the first semiconductor element Su.

Figure 6C:
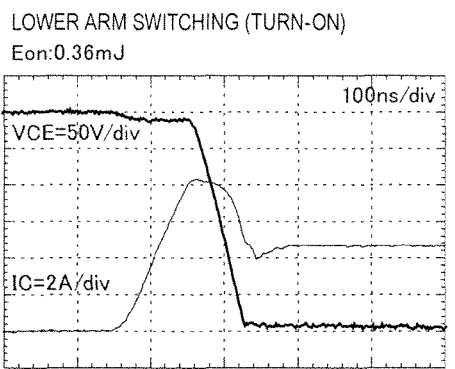
Figure 6D:
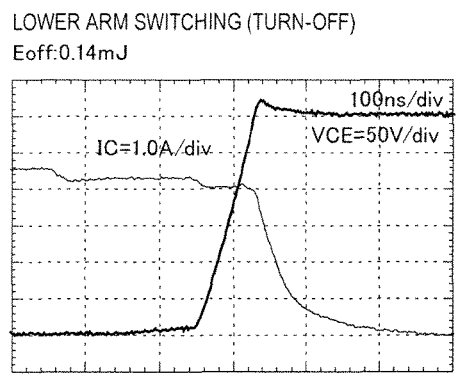

In regard to the switching losses Eoff when turning-off of the first semiconductor element Su and the second semiconductor element Sx, as illustrated in FIG. 6C and FIG. 6D, the first semiconductor element Su is Eoff=0.12 mJ and the second semiconductor element Sx is Eoff=0.14 mJ, and no large difference occurs between them.

In a case where the intelligent power module 25 is configured in this way, the switching loss of the second semiconductor element Sx which serves as the lower-arm-side one becomes worse more than the switching loss of the first semiconductor element Su which serves as the upper-arm-side one.

Accordingly, it becomes possible to provide a section that the second semiconductor elements Sx-Sz are controlled to the always-ON states by performing lower-side-stuck two-phase modulation control on the inverter unit 15 by the control unit 16 as described above, and thereby it becomes possible to reduce the switching losses of the second semiconductor elements Sx-Sz.

As a result, it becomes possible to compensate for worsening of the switching losses of the second semiconductor elements Sx-Sz in a case of constituting the intelligent power module 25. Therefore, it becomes possible to reduce the total switching loss of the first semiconductor elements Su-Sw and the second semiconductor elements Sx-Sz. In contrast, in the upper-side-stuck two-phase modulation control for forming the bottom-shaped waveform on the lower side in Patent Literature 1, it results in increasing the total switching loss inversely.

Figure 7A:
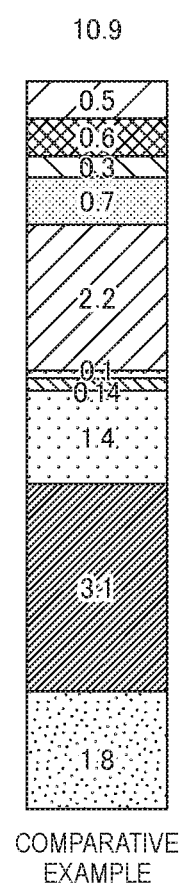
FIGS. 7A to 7B are diagrams expressing simulation results of respective losses of one switching arm section, in which (a) is a graph expressing a loss of a comparative example and (b) is a graph of a loss of a second embodiment.

Further, in regard to a case of performing the above-mentioned lower-side-stuck two-phase modulation control on the inverter unit 15, a result that a simulation has been made on a comparative example that the first semiconductor elements Su-Sw and the second semiconductor elements Sx-Sz include the same IGBTs and the diodes are formed as the same freewheeling diodes is illustrated in FIG. 7A. In a case of this comparative example, the conduction loss of the first semiconductor element Su on the upper arm side was Von=1.8 mJ, the switching loss thereof when turning on was ton=3.1 mJ, the switching loss thereof when turning-off was toff=1.4 mJ, the conduction loss of the freewheeling diode Du was Vf=0.14 mJ and the recovery loss thereof was trr=0.1 mJ.

On the other hand, the conduction loss of the second semiconductor element Sx on the lower arm side was Von=2.2 mJ, the switching loss thereof when turning-on was ton=0.7 mJ, the switching loss thereof when turning-off was toff=0.3 mJ, the conduction loss of the freewheeling diode Dx was Vf=0.6 mJ and the recovery loss thereof was trr=0.5 mJ. Then, the total loss was 10.9 mJ.

From the result of this simulation in FIG. 7A, the switching loss when turning-on of the first semiconductor element Su is predominant on the upper arm part. The switching loss when turning-on of this first semiconductor element Su also depends on the characteristic of the freewheeling diodes of the lower arm part.

In contrast, on the lower arm part, the conduction loss of the second semiconductor element Sx is predominant.

Figure 7B:
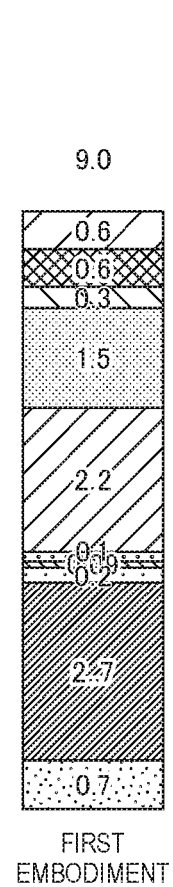

Therefore, a result of simulation made in a case where the MOSFETs whose switching loss when turning-on is little in comparison with the IGBT are used as the first semiconductor elements Su-Sw and the IGBTs whose conduction loss is little in comparison with the MOSFET are used as the second semiconductor elements Sx-Sz as in the above-mentioned first embodiment is illustrated in FIG. 7B.

As apparent from this FIG. 7B, by using the MOSFETs as the first semiconductor elements and using the IGBTs as the second semiconductor elements, the conduction loss of the first semiconductor elements Su-Sw becomes Von=0.7 mJ, the switching loss thereof when turning-on becomes ton=2.7 mJ, the switching loss thereof when turning-off becomes toff=0.2 mJ, the conduction loss of the freewheeling diodes Du-Dw becomes Vf=0.09 mJ and the recovery loss thereof becomes trr=0.1 mJ and they are greatly reduced relative to those of the comparative example.

On the other hand, the conduction loss of the second semiconductor elements Sx-Sz is Von=2.2 mJ with no change from that of the comparative example and the switching loss thereof when turning-on reaches ton=1.5 mJ which is increased to about two times that of the comparative example. In addition, the switching loss thereof when turning-off is toff=0.3 mJ and the conduction loss of the freewheeling diodes Dx-Dz is Vf=0.6 mJ with no change from those of the comparative example and the recovery loss thereof amounts to trr=0.6 mJ which is slightly increased relative to that of the comparative example.

Then, the total loss becomes 9.0 mJ and it became possible to improve the total loss by about 15% in comparison with that of the comparative example in FIG. 7A.

Incidentally, although in the above-mentioned first embodiment, a case where the Si-MOSFETs are used as the first semiconductor elements Su-Sw is described, they are not limited to them and wide bandgap semiconductor elements made of SiC, GaN, diamond and so forth which are less than them in switching loss when turning-on may be applied as the first semiconductor elements Su-Sw. In this case, it becomes possible to more reduce the total loss.

Next, a second embodiment of the semiconductor device according to the present invention will be described accompanied by FIG. 8.

In this second embodiment, in place of the case where the semiconductor elements which are little in switching loss are used as the first semiconductor elements Su-Sw and the semiconductor elements which are little in conduction loss are used as the second semiconductor elements Sx-Sz as in the aforementioned first embodiment, common semiconductor switching elements are used as the first semiconductor elements Su-Sw and the second semiconductor elements Sx-Sz and only the freewheeling diodes of the lower arm part are changed to diodes of the switching loss which is smaller than the switching loss of those of the upper arm part.

Figure 8:
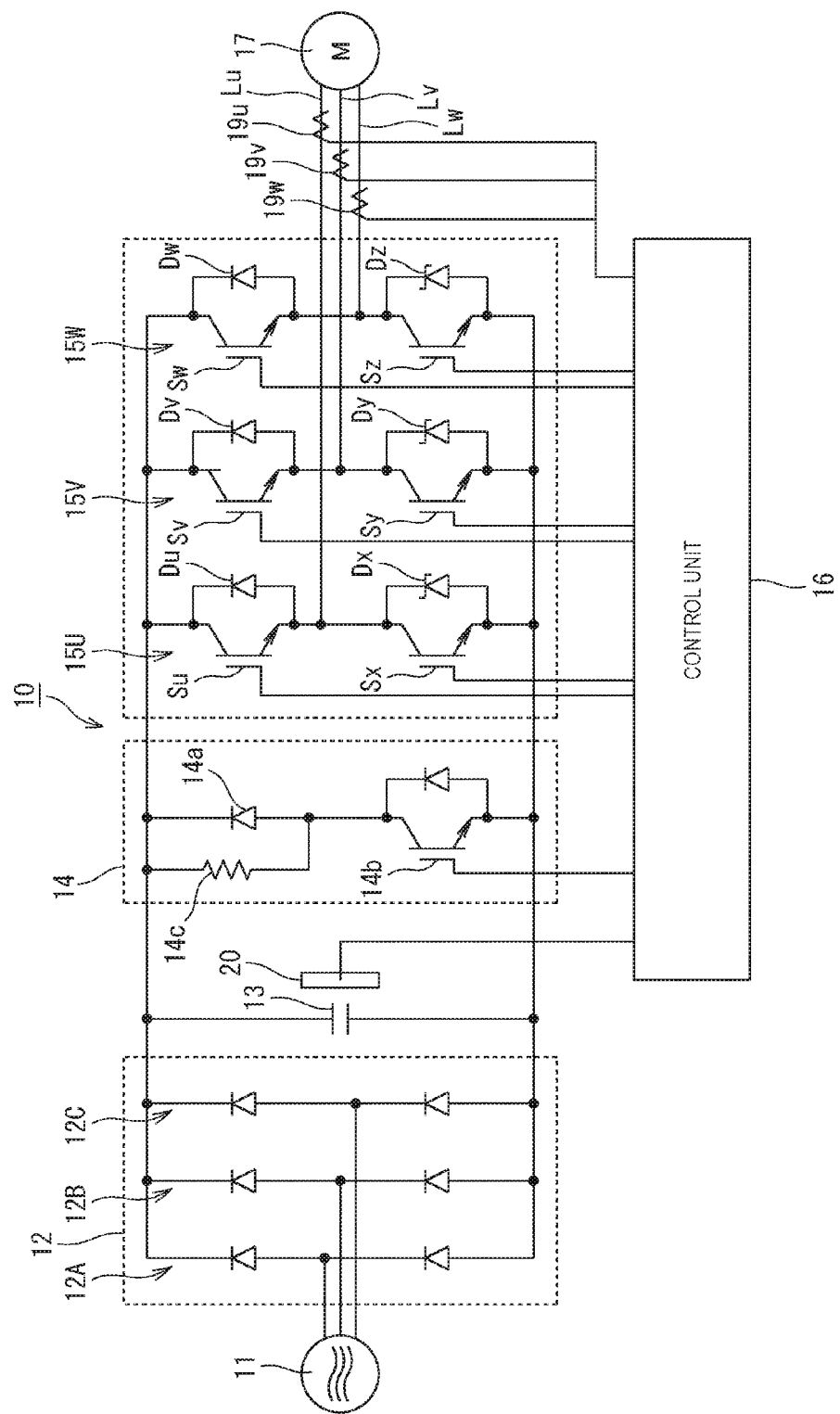
FIG. 8 is a circuit diagram illustrating the second embodiment of the semiconductor device according to the present invention.

That is, in the second embodiment, as illustrated in FIG. 8, the IGBTs which are little in conduction loss are used as the first semiconductor elements Su-Sw and the second semiconductor elements Sx-Sz of the inverter unit 15 and Si-freewheeling diodes which are large in switching loss are used as the freewheeling diodes Du-Dw of the upper arm part.

In addition, SiC-Schottky diodes which are wide bandgap diodes that the switching loss (the recovery loss due to a reverse recovery current) is less than the switching loss of the Si-freewheeling diodes are used as the freewheeling diodes Dx-Dz of the lower arm part. Other configurations have configurations which are the same as those of the aforementioned first embodiment and the same symbols are assigned to parts corresponding to those in FIG. 1 and detailed description thereof is omitted.

This second embodiment is the one made by focusing on the switching losses of the freewheeling diodes Dx-Dz of the lower arm parts of the U-phase switching arm section 15U, the V-phase switching arm section 15V and the W-phase switching arm section 15W.

As described before in the first embodiment, the first semiconductor elements Su-Sw and the second semiconductor elements Sx-Sz of the inverter unit 15 include the same semiconductor switching elements and the freewheeling diodes thereof also include the same Si-freewheeling diodes. In a case where the lower-side-stuck two-phase modulation control is performed on this inverter unit 15, the switching loss when turning-on of the first semiconductor elements Su-Sw is predominant.

In this second embodiment, it is made so as to reduce the switching loss when turning-on of the first semiconductor elements Su-Sw by reducing the switching loss (the recovery losses) of the freewheeling diodes of the lower arm which faces the upper arm.

That is, the switching loss will be examined in regard to each of the U-phase switching arm section 15U, the V-phase switching arm section 15V and the W-phase switching arm section 15W.

For example, in a case where the U-phase switching arm section 15U is made representative, the switching characteristics when using the Si-freewheeling diodes which are large in switching loss as the freewheeling diode Du of the upper arm part and the freewheeling diode Dx of the lower arm part as illustrated in FIG. 9 are as illustrated in FIGS. 10A and 10B.

That is, a case where the first semiconductor element Su of the upper arm part is turned on from the OFF state and the freewheeling diode Dx of the lower arm part is brought from the ON state into the OFF state is considered. A main circuit current which flows from a connection point of the first semiconductor element Su with the second semiconductor element Sx to the U-phase winding wire of the three-phase motor 17 at this time is referred to as IC and a reflux current which flows through the freewheeling diode Dx of the lower arm part from a U-phase coil is referred to as IF.

In this case, it enters a state where a reverse bias voltage is applied to the freewheeling diode Dx of the lower arm part from a forward biased state where the reflux current IF according to the previous-time main circuit current IC flows thereto and the reflux current IF begins decreasing as illustrated in FIG. 10B.

On the other hand, since the first semiconductor element Su of the upper arm part is turned on from the OFF state, the main circuit current IC begins increasing from zero as illustrated in FIG. 10A and a collector-to-emitter voltage VCE of the first semiconductor element Su begins decreasing as illustrated in FIG. 10A.

At this time, since the freewheeling diode Dx of the lower arm part is in a state where the reverse bias voltage is applied thereto, a large reverse recovery current flows in a direction opposite to the diode in a short time after the reflux current has been reduced to zero. This reverse recovery current reaches a negative-side peak value and thereafter returns to zero.

On the other hand, in the first semiconductor element Su of the upper arm part, a reverse recovery peak current of the freewheeling diode Dx of the lower arm part is superimposed on the main circuit current IC, it largely jumps up and thereafter has an almost fixed value according to a gate voltage of the first semiconductor element Su as illustrated in FIG. 10A.

Accordingly, it becomes possible to reduce the switching loss when turning-on of the first semiconductor element Su of the upper arm part by using, for example, the SiC-freewheeling diode which is the wide bandgap diode which is small in reverse recovery current and is smaller in switching loss (recovery loss) than the Si-freewheeling diode as the freewheeling diode Dx of the lower arm part. Incidentally, as the freewheeling diodes Dx-Dz, SiC-Schottky diodes and diodes in which a JBS (Junction Barrier Schottky) structure is applied may be used not limited to the SiC-freewheeling diodes and further diodes which are smaller than the Si-freewheeling diodes in switching loss (recovery loss) such as GaN-freewheeling diodes, diamond-freewheeling diodes and so forth may be used.

In regard to the freewheeling diodes Du-Dw of the upper arm part of each of the U-phase switching arm section 15U, the V-phase switching arm section 15V and the W-phase switching arm section 15W, the Si-freewheeling diodes which are large in switching loss (recovery loss) are left as they are in this way. On the other hand, the SiC-freewheeling diodes which are smaller in switching loss (recovery loss) than the Si-freewheeling diodes are used for the freewheeling diodes Dx-Dz of the lower arm part which faces the upper arm. Thereby, it becomes possible to reduce the switching losses when turning-on of the first semiconductor elements Su-Sw and thereby to reduce the total loss.

A result of performing the simulation which is the same as that in the first embodiment on one switching arm section in this second embodiment is illustrated in FIG. 11B. Incidentally, FIG. 11A illustrates the loss of a conventional example in which the first semiconductor elements Su-Sw and the second semiconductor elements Sx-Sz are made as the IGBTs and the freewheeling diodes Du-Dw of the upper arm part and the freewheeling diodes Dx-Dz of the lower arm part are made as the Si-freewheeling diodes.

As apparent from this FIG. 11B, according to the second embodiment, although the conduction loss of the first semiconductor elements Su-Sw is Von=1.8 mJ with no change from that of the conventional example, the switching loss when turning-on is greatly reduced to ton=1.4 mJ. In addition, although the switching loss when turning-off is toff=0.14 mJ with no change from that of the conventional example and the conduction loss of the freewheeling diode Du-Dw is Vf=0.14 mJ with no change from that of the conventional example, the recovery loss thereof is greatly reduced to trr=0.02 mJ.

In addition, in regard to the second semiconductor elements Sx-Sz, the conduction loss is Von=2.2 mJ, the switching loss when turning-on is ton=0.7 mJ, the switching loss when turning-off is toff=0.3 mJ, the conduction loss of the freewheeling diodes Dx-Dz is Vf=0.7 mJ and the recovery loss thereof is trr=0.5 mJ, and they have almost the same values as those of the conventional example.

Accordingly, the total loss becomes 9.2 mJ and it becomes possible to improve the total loss by about 12% in comparison with the conventional example in FIG. 7A.

In this second embodiment, it becomes possible to reduce the switching losses when turning-on of the first semiconductor elements which become the upper arm part and thereby to reduce the total loss simply by using the IGBTs which are small in conduction loss for the first semiconductor elements Su-Sw and the second semiconductor elements Sx-Sz, by using the Si-freewheeling diodes which are large in switching loss (recovery loss) for the freewheeling diodes Du-Dw of the upper arm part, and by using the wide bandgap diodes which are small in switching loss (recovery loss) in comparison with the Si-freewheeling diodes only for the freewheeling diodes Dx-Dz of the lower arm part.

In addition, following the first embodiment, the first semiconductor elements Su-Sw may be made as N-channel type MOSFETs which are smaller in switching loss than the IGBT.

Incidentally, although in the above-mentioned embodiments, a case where the semiconductor device according to the present invention is applied to the inverter unit of the power conversion apparatus which drives the inductive load is described, it is not limited thereto and it is also possible to apply it to a controlling apparatus which makes a welding machine generate arc in place of the inductive load.

Figure 12:
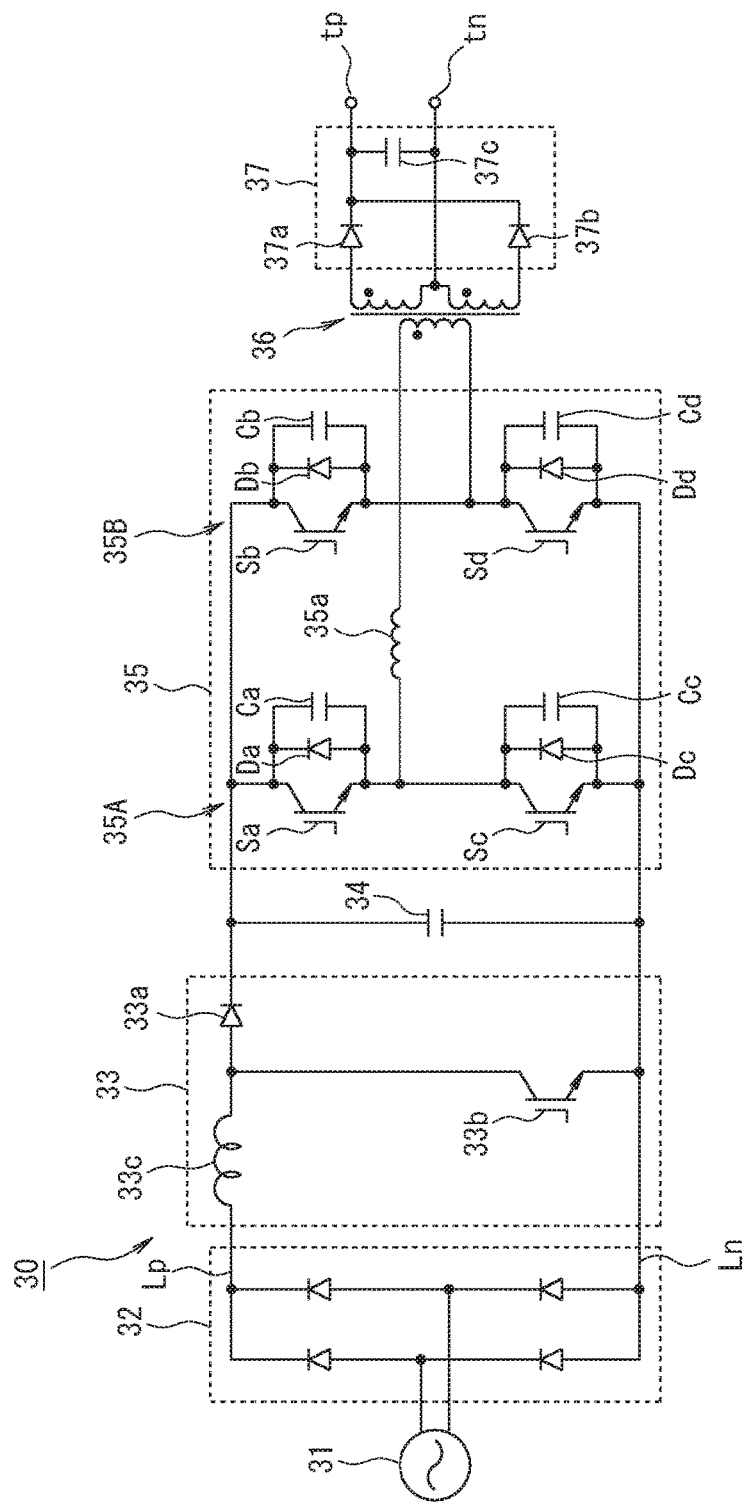
FIG. 12 is a circuit diagram illustrating a third embodiment of the semiconductor device according to the present invention.

That is, as illustrated in FIG. 12, a controlling apparatus 30 for welding machine is equipped with a full-wave rectification circuit 32 which performs full-wave rectification on a commercial single-phase AC power source 31, a power factor improvement circuit 33 which is connected to the positive electrode line Lp and the negative electrode line Ln through which the DC power is output from this full-wave rectification circuit 32, a smoothing capacitor 34 which is connected between the positive electrode line Lp and the negative electrode line Ln on the output side of the power factor improvement circuit 33, an inverter unit 35 which is connected in parallel with the smoothing capacitor 34 between the positive electrode line Lp and the negative electrode line Ln, a transformer 36 which is connected to the output side of the inverter unit 35, and an output-side rectification circuit 37 which is connected to the secondary side of the transformer 36.

Here, the full-wave rectification circuit 32 constitutes a single-phase full-bridge circuit by four diodes and converts commercial AC power into the DC power.

The power factor improvement circuit 33 has a configuration of a boost chopper which is equipped with a third semiconductor element 33a which is connected to the positive electrode line Lp, a fourth semiconductor element 33b which is connected between the input side of the third semiconductor element 33a and the negative electrode line Ln and a reactor 33c which is connected between a connection point of the third semiconductor element 33a with the fourth semiconductor element 33b and the positive electrode side of the full-wave rectification circuit 32.

Here, the third semiconductor element 33a includes the wide bandgap semiconductor element such as the SiC-freewheeling diode, the SiC-Schottky diode, the GaN-diode, the diamond diode and so forth whose switching losses (recovery losses) are smaller than the switching loss (the recovery loss) of the Si-freewheeling diode.

The fourth semiconductor element 33b includes the IGBT which is the low conduction loss semiconductor element which is smaller in conduction loss than the MOSFET.

The inverter unit 35 is equipped with a first switching arm section 35A in which a first semiconductor element Sa and a second semiconductor element Sc are connected in series between the positive electrode line Lp and the negative electrode line Ln and a second switching arm section 35B in which a first semiconductor element Sb and a second semiconductor element Sd are connected in series between the positive electrode line Lp and the negative electrode line Ln and constitutes a single-phase full-bridge circuit by these first switching arm section 35A and second switching arm section 35B.

Freewheeling diodes Da and Db are connected in anti-parallel with the respective first semiconductor elements Sa and Sb and capacitors Ca and Cb are connected in parallel with these freewheeling diodes Da and Db.

Freewheeling diodes Dc and Dd are connected in anti-parallel with also the respective second semiconductor elements Sc and Sd and capacitors Cc and Cd are connected in parallel with these freewheeling diodes Dc and Dd.

The transformer 36 is connected to a connection point of the first semiconductor element Sa with the second semiconductor element Sc of the inverter unit 35 at one end of a primary side winding wire via a reactor 35a and is directly connected to a connection point between the first semiconductor element Sb and the second semiconductor element Sd at the other end thereof. The output-side rectification circuit 37 is connected to a secondary winding wire of the transformer 36.

In the output-side rectification circuit 37, anodes of diodes 37a and 37b are connected to both ends of the secondary side winding wire of the transformer 36, cathodes of the diodes 37a and 37b are connected together and are connected to a positive electrode side output terminal tp, an intermediate tap of the secondary side winding wire of the transformer 36 is directly connected to a negative electrode side output terminal tn and a smoothing capacitor 37c is connected between the positive electrode side output terminal tp and the negative electrode side output terminal tn. Then, the positive electrode side output terminal tp and the negative electrode side output terminal to are connected to welding terminals of the welding machine and a workpiece.

According to this second embodiment, the commercial AC power which is input from the commercial single-phase AC power source 31 is subjected to full-wave rectification by the full-wave rectification circuit 32 and is converted into the DC power and this DC power is input into the power factor improvement circuit 33. An output from this power factor improvement circuit 33 is stored into the smoothing capacitor 34, is converted into a single-phase alternating current by the inverter unit 35, thereafter is boosted by the transformer 36, is converted into a direct current by the output-side rectification circuit 37 and is supplied to the welding machine.

Incidentally, in the power factor improvement circuit 33, to store electric energy into the reactor 33c when the fourth semiconductor element 33b is in the ON state and to store the electric energy stored in the reactor 33c into the smoothing capacitor 34 via the third semiconductor element 33a while the fourth semiconductor element 33b is in the OFF state by preforming switching control on the fourth semiconductor element 33b by a not illustrated control unit are repeated.

At this time, since when the fourth semiconductor element 33b is in the OFF state, the electric energy which is stored in the reactor 33c flows to the smoothing capacitor 34 through the third semiconductor element 33a which includes the diode, the third semiconductor element 33a is in a forward-biased state.

When the fourth semiconductor element 33b enters a turn-on state from the OFF state in this forward-biased state, the anode side of the diode which configures the third semiconductor element 33a is connected to the negative electrode line Ln via the fourth semiconductor element 33b. Therefore, it enters a state where a DC voltage which is stored in the smoothing capacitor 34 is applied to the cathode side of the diode as a reverse bias voltage.

Consequently, although the current which is flowing to the third semiconductor element 33a is gradually decreased at a predetermined decrease rate (−di/dt) and is decreased to zero once, thereafter, the large reverse recovery current flows in the direction opposite to the diode in a short time and this reverse recovery current is added to the fourth semiconductor element 33b. Therefore, in a case where the Si-freewheeling diode which is large in switching loss (recovery loss) is used as the fourth semiconductor element 33b, the reverse recovery current is superimposed on a collector current Ic of the fourth semiconductor element 33b, the peak value of the collector current largely jumps up and the switching loss when turning-on of the fourth semiconductor element 33b is increased similarly to FIG. 10A of the aforementioned first embodiment.

However, in the above-mentioned second embodiment, the wide bandgap diode such as the SiC-freewheeling diode, the SiC-Schottky diode, the GaN-diode, the diamond diode and so forth which are sufficiently small in switching loss (recovery loss) in comparison with the Si-freewheeling diode is used as the third semiconductor element 33a. Therefore, it becomes possible to greatly reduce the switching loss when turning-on of the fourth semiconductor element 33b and thereby to reduce the total loss similarly to the aforementioned first embodiment.

Incidentally, in the inverter unit 35, it becomes possible to reduce the switching losses when turning-on of the first semiconductor elements Sa and Sb and thereby to reduce the total loss similarly to the aforementioned first embodiment by using the Si-freewheeling diode which is large in switching loss (recovery loss) for the freewheeling diodes Da and Db which become the upper arm part and by using the wide bandgap diodes of the switching loss (the recovery loss) which is smaller than the switching loss (the recovery loss) of the Si-freewheeling diode for the freewheeling diodes Dc and Dd which become the lower arm part.

It is possible to exhibit the same advantageous effect as that of the power factor improvement circuit in this case also by the brake circuit 14 in the first embodiment.

Figure 13:
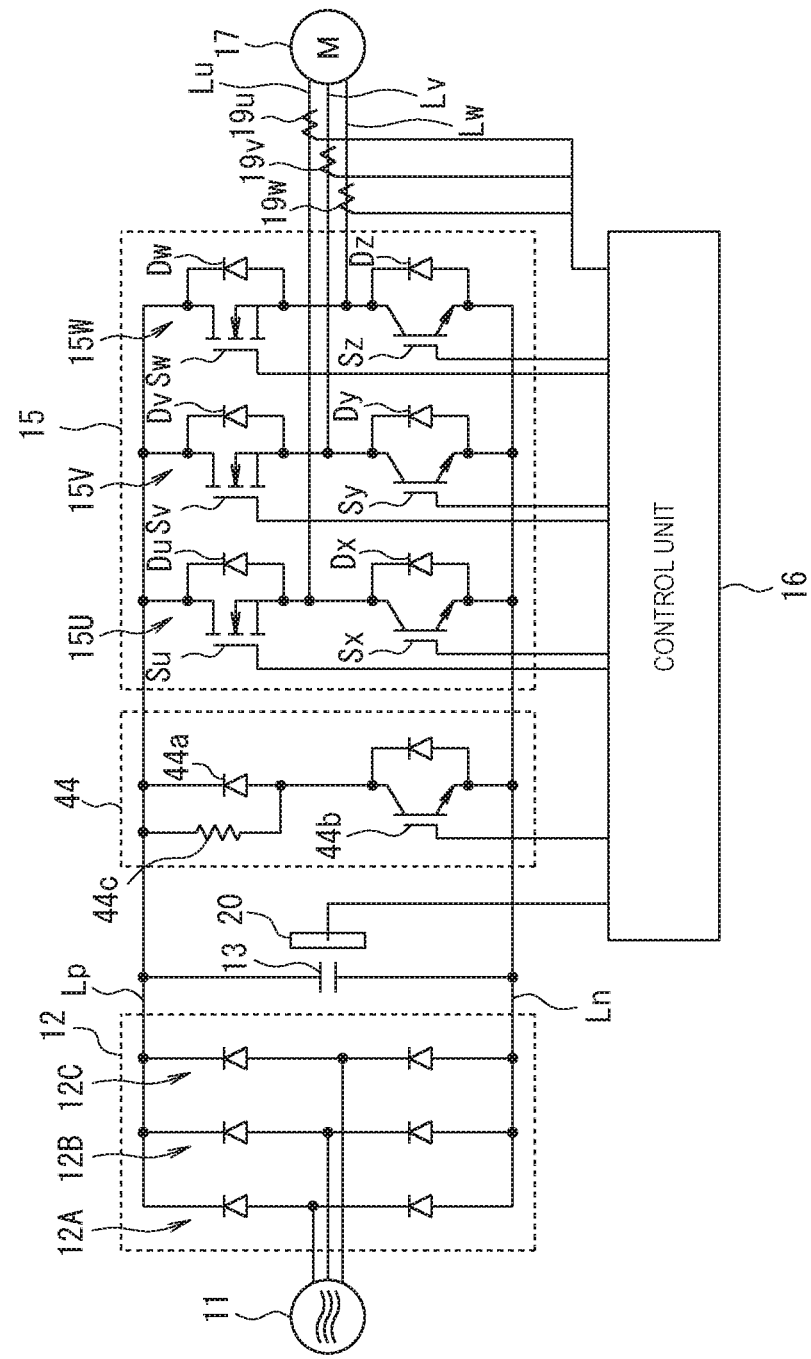
FIG. 13 is a circuit diagram illustrating an altered example of the semiconductor device according to the present invention.

That is, as illustrated in FIG. 13, the diode 14a of the brake circuit 14 illustrated in FIG. 1 and FIG. 8 is made as a third semiconductor element 44a, the switching semiconductor element 14b is made as a fourth semiconductor element 44b and the resistor 14c is made as a resistor 44c.

The wide bandgap element which is less than a Si-pin diode in reverse recovery current, the wide bandgap element which is less than the Si-pin diode in switching loss (recovery loss) and is less than it in reverse recovery current such as the SiC-freewheeling diode, the GaN-freewheeling diode, a SiC-Schottky barrier diode and so forth is used for the third semiconductor element 44a. A semiconductor element which is smaller than the MOSFET in conduction loss, for example, the IGBT is used for the fourth semiconductor element 44b. In regard to other configurations, it has the same configurations as the first embodiment, the same symbols are assigned to the parts corresponding to those in FIG. 1 in FIG. 13 and detailed description thereof is omitted.

By constituting the brake circuit 14 in this way, it becomes possible to operate the three-phase motor 17 as a generator and thereby to perform regenerative braking by operating the inverter unit 15 as the full-wave rectification circuit by the control unit 16 when braking the three-phase motor 17 which becomes the load.

In this regenerative braking, the three-phase AC power which is output from the three-phase motor 17 is subjected to full-wave rectification by the inverter unit 15 and is stored into the smoothing capacitor 13. At this time, the current flows through the resistor 44c and the fourth semiconductor element 44b and a current bypass line for the inverter unit 15 is formed by performing switching control on the fourth semiconductor element 44b of the brake circuit by the control unit 16. In this occasion, rise in DC voltage Vdc applied to the inverter unit 15 is suppressed by consuming the power by the resistor 44c. A surge voltage which is generated in this occasion is absorbed by the third semiconductor element 44a.

In this brake circuit 44, since the regenerative power is consumed by the resistor 44c, the resistance value of the resistor 44c is set to a large value. Therefore, when it enters a regenerative braking state and the fourth semiconductor element 44a is made to perform the switching operation, the diode which configures the third semiconductor element 44a enters the reverse-biased state with the regenerative power. In a case where the Si-freewheeling diode is used as this third semiconductor element 44a, similarly to the power factor improvement circuit 33 of the aforementioned welding machine control circuit, the reverse recovery current which flows through the third semiconductor element 44a becomes more to increase the switching loss when turning-on of the fourth semiconductor element 44b.

However, it becomes possible to lower the switching loss (the recovery loss) and to suppress the peak value of the reverse recovery current by using the wide bandgap diode such as the SiC-Schottky diode and so forth as the fourth semiconductor element 44b. Also in this case, similarly to the case in FIG. 12, it is possible to reduce the switching loss when turning-on of the fourth semiconductor element 44b and it is possible to reduce the total loss of the third semiconductor element 44a and the fourth semiconductor element 44b.

Incidentally, although in the above-mentioned embodiments, the cases where the semiconductor device of the present invention is applied to the power conversion apparatus and the controlling apparatus for welding machine are described, it is not limited thereto and it is possible to apply the present invention to other apparatuses having series circuits for connecting the first semiconductor element and the second semiconductor element or the third semiconductor element and the fourth semiconductor element in series.

In addition, in regard to the one having the brake circuit in the above-mentioned embodiments, since the brake circuit is not required in all applications, the brake circuit may be omitted in an application which does not require the brake circuit.

REFERENCE SIGNS LIST

10 . . . power conversion apparatus, 11 . . . three-phase AC power source, 12 . . . full-wave rectification circuit, 13 . . . smoothing capacitor, 14 . . . brake circuit, 15 . . . inverter unit, Su-Sw . . . first semiconductor element, Sx-Sz . . . second semiconductor element, Du-Dw, Dx-Dz . . . freewheeling diode, 16 . . . control unit, 17 . . . three-phase motor, 25 . . . intelligent power module, 30 . . . controlling apparatus for welding machine, 31 . . . commercial single-phase AC power source, 32 . . . full-wave rectification circuit, 33 . . . power factor improvement circuit, 33a . . . third semiconductor element, 33b . . . fourth semiconductor element, 33c . . . reactor, 34 . . . smoothing capacitor, 35 . . . inverter unit, Sa, Sb . . . first semiconductor element, Sc, Sd . . . second semiconductor element, Da-Dd . . . freewheeling diode, 36 . . . transformer, 37 . . . output-side rectification circuit

The invention claimed is:
1. A semiconductor device comprising:
a bridge circuit including a plurality of switching arm sections connected in parallel, the plurality of switching arm sections having respective series-connected first semiconductor elements and second semiconductor elements, wherein
the first semiconductor elements constitute upper arms of the bridge circuit,
the second semiconductor elements constitute lower arms of the bridge circuit, and
for each of the plurality of switching arm sections,
the respective first semiconductor element includes a low switching loss semiconductor element having a switching loss which is smaller than a switching loss of the respective second semiconductor element, and
the respective second semiconductor element includes an insulated gate bipolar transistor (IGBT) as a low conduction loss semiconductor element having a conduction loss which is smaller than a conduction loss of the respective first semiconductor element, and
a freewheeling diode is connected in anti-parallel with the respective second semiconductor element,
a first gate drive circuit connected to a gate and an emitter of the low switching loss semiconductor element of one of the plurality of switching arm sections, the first gate drive circuit being configured to control the gate based on a reference voltage provided by the connection to the emitter;
a second gate drive circuit connected to a gate of the low conduction loss semiconductor element of the one of the plurality of switching arm sections, the second gate drive circuit being configured to control the gate of the low conduction loss semiconductor element of the one of the plurality of switching arm sections; and
a control circuit configured to
control each of the upper arms to alternate among an OFF state and a pulse width modulated (PWM) state, and
control each of the lower arms to alternate among an OFF state, a pulse width modulated (PWM) state, and an always-ON state,
wherein the second gate drive circuit and an emitter of the low conduction loss semiconductor element of the one of the plurality of switching arm sections are connected to a common ground terminal of the semiconductor device.

2. The semiconductor device according to claim 1, wherein, for each of the plurality of switching arm sections, the low switching loss semiconductor element includes a semiconductor element having a switching loss which is smaller than a switching loss of an insulated gate bipolar transistor.

3. The semiconductor device according to claim 1, wherein, for each of the plurality of switching arm sections, the low conduction loss semiconductor element includes a semiconductor element having a conduction loss which is smaller than a conduction loss of a MOSFET.

4. The semiconductor device according to claim 1, wherein, for each of the plurality of switching arm sections, the first semiconductor element includes a switching semiconductor element, and a diode is connected in anti-parallel with the switching semiconductor element, and the freewheeling diode includes a wide bandgap diode having conduction loss which is smaller than a conduction loss of the diode of the first semiconductor element which constitutes the upper arm.

5. A semiconductor device comprising:
a bridge circuit including three switching arm sections connected in parallel for three phases, each the three switching arm sections having respective series-connected first semiconductor elements and second semiconductor elements; and
a control circuit configured to control the first semiconductor elements and the second semiconductor elements of the bridge circuit to perform a switching operation to drive an inductive load, wherein
the first semiconductor elements constitute upper arms of the bridge circuit,
the second semiconductor elements constitute lower arms of the bridge circuit,
for each of the three switching arm sections,
the respective first semiconductor element includes a low switching loss semiconductor element having a switching loss which is smaller than a switching loss of the respective second semiconductor element, and
the respective second semiconductor element includes an insulated gate bipolar transistor (IGBT) as a low conduction loss semiconductor element having a conduction loss which is smaller than a conduction loss of the first semiconductor element, and
a freewheeling diode is connected in anti-parallel with the respective second semiconductor element,
the control circuit drives the inductive load, by a two-phase modulation system of periodically fixing each phase voltage by
controlling each of the upper arms to alternate among an upper-arm OFF state and a pulse width modulated (PWM) state, and
controlling each of the lower arms to alternate among an OFF state, a lower-arm pulse width modulated (PWM) state, and an always-ON state, such that the lower arm of one of the three switching arm section is controlled from the lower-arm pulse width modulated (PWM) state to the always ON state while an upper arm of the one of the three switching arm sections is controlled to be in the upper-arm OFF state.

6. The semiconductor device according to claim 5, wherein, for each of the three switching arm sections, the low switching loss semiconductor element includes a semiconductor element having a switching loss which is smaller than a switching loss of an insulated gate bipolar transistor.

7. The semiconductor device according to claim 5, wherein, for each of the three switching arm sections, the low conduction loss semiconductor element includes a semiconductor element having a conduction loss which is smaller than a conduction loss of a MOSFET.

8. The semiconductor device according to claim 5, wherein, for each of the three switching arm sections,
the first semiconductor element includes a switching semiconductor element and a diode connected in anti-parallel with the switching semiconductor element, and
the freewheeling diode includes a wide bandgap diode having conduction loss which is smaller than a conduction loss of the diode of the first semiconductor element which constitutes the upper arm.

9. A semiconductor device having:
a first semiconductor element and a second semiconductor element, connected in series;
a first gate drive circuit; and
a second gate drive circuit, wherein
the first semiconductor element includes a low switching loss semiconductor element having a switching loss which is smaller than a switching loss of the second semiconductor element,
the first gate drive circuit is connected to a gate and an emitter of the low switching loss semiconductor element, the first gate drive circuit being configured to control the gate of the low switching loss semiconductor element based on a reference voltage provided by the connection to the emitter, and
the second semiconductor element includes an insulated gate bipolar transistor (IGBT) as a low conduction loss semiconductor element having a conduction loss which is smaller than a conduction loss of the first semiconductor element,
a freewheeling diode is connected in anti-parallel with the respective second semiconductor element,
the second gate drive circuit and an emitter of the low conduction loss semiconductor element being connected to a common ground terminal of the semiconductor device,
the second gate drive circuit is connected to a gate of the low conduction loss semiconductor element, and is configured to control the gate of the low conduction loss semiconductor element;
a control circuit configured to
control the first semiconductor element to alternate among an OFF state and a pulse width modulated (PWM) state, and
control the second semiconductor element to alternate among an OFF state, a pulse width modulated (PWM) state, and an always-ON state; and
a third semiconductor element and a fourth semiconductor element connected in series, the third semiconductor element and the fourth semiconductor element connected in parallel to the first semiconductor element and the second semiconductor element, wherein
the third semiconductor element includes a wide bandgap diode of a switching loss which is smaller than a switching loss of an insulated gate bipolar transistor, and
the fourth semiconductor element includes a low conduction loss semiconductor element having a conduction loss which is smaller than a conduction loss of a MOSFET.

10. The semiconductor device according to claim 9, wherein a power factor improvement circuit of a power conversion apparatus includes the wide bandgap diode, the low conduction loss semiconductor element and a reactor which is connected between a connection point of the wide bandgap diode with the low conduction loss semiconductor element and an input side.

11. The semiconductor device according to claim 9, wherein a brake circuit unit of a power conversion apparatus includes the wide bandgap diode and the low conduction loss semiconductor element.

12. A semiconductor device comprising:
a first semiconductor element and a second semiconductor element, connected in series, wherein
the first semiconductor element includes a low switching loss semiconductor element having a switching loss which is smaller than a switching loss of the second semiconductor element, and
the second semiconductor element includes an insulated gate bipolar transistor (IGBT) as a low conduction loss semiconductor element having a conduction loss which is smaller than a conduction loss of the first semiconductor element, a first gate drive circuit connected to a gate and an emitter of the low switching loss semiconductor element, the first gate drive circuit being configured to control the gate of the low switching loss semiconductor element based on a reference voltage provided by the connection to the emitter;

a second gate drive circuit connected to a gate of the low conduction loss semiconductor element, and configured to control the gate of the low conduction loss semiconductor element;

a freewheeling diode connected in anti-parallel with the second semiconductor element; and a control circuit configured to
control the first semiconductor element to alternate among an OFF state and a pulse width modulated (PWM) state, and
control the second semiconductor element to alternate among an OFF state, a pulse width modulated (PWM) state, and an always-ON state, wherein the second gate drive circuit and an emitter of the low conduction loss semiconductor element are connected to a common ground terminal of the semiconductor device.

13. The semiconductor device according to claim 12, wherein the low switching loss semiconductor element includes a semiconductor element having a switching loss which is smaller than a switching loss of the insulated gate bipolar transistor.

14. The semiconductor device according to claim 13, wherein the low conduction loss semiconductor element includes a semiconductor element having a conduction loss which is smaller than a conduction loss of a MOSFET.

15. The semiconductor device according to claim 12, wherein the low conduction loss semiconductor element includes a semiconductor element having a conduction loss which is smaller than a conduction loss of a MOSFET.

16. The semiconductor device according to claim 12, wherein the first semiconductor element includes a switching semiconductor element, and a diode is connected in anti-parallel with the switching semiconductor element, and the freewheeling diode includes a wide bandgap diode having conduction loss which is smaller than a conduction loss of the diode connected in anti-parallel with the first semiconductor element which constitutes an upper arm.

17. The semiconductor device according to claim 16, wherein the switching semiconductor element of the first semiconductor element, is an insulated gate bipolar transistor (IGBT).

18. The semiconductor device according to claim 17, wherein the IGBT of the first semiconductor element and the IGBT of the second semiconductor element are Si-insulated gate bipolar transistors.

19. The semiconductor device according to claim 12, wherein the emitter of the low conduction loss semiconductor element is connected to the common ground terminal via a shunt resistor.

* * * * *